United States Patent [19]

Nakanishi

[11] Patent Number: 5,412,021

[45] Date of Patent: May 2, 1995

[54] WATER-BASE ERASABLE INK COMPOSITION FOR USE IN MARKING PENS

[75] Inventor: Mikihiko Nakanishi, Osaka, Japan

[73] Assignee: Sakura Color Products Corporation, Osaka, Japan

[21] Appl. No.: 109,705

[22] Filed: Aug. 19, 1993

[30] Foreign Application Priority Data

Aug. 24, 1992 [JP] Japan .................. 4-223850
Jun. 17, 1993 [JP] Japan .................. 5-146318
Aug. 9, 1993 [JP] Japan .................. 5-197206

[51] Int. Cl.$^6$ .................. C08K 5/06; C09D 11/10
[52] U.S. Cl. .................. 524/523; 524/377; 524/503; 524/557; 524/598; 523/160; 523/161
[58] Field of Search .............. 524/523, 503, 377, 598, 524/557; 523/160, 161

[56] References Cited

U.S. PATENT DOCUMENTS 4,935,461  6/1990  Nakamure .................. 523/160
5,009,763  4/1991  Imagawa .................. 524/311

*Primary Examiner*—Paul R. Michl
*Assistant Examiner*—Olga Asinovsky
*Attorney, Agent, or Firm*—Wenderoth, Lind & Ponack

[57] ABSTRACT

A water-base erasable ink composition for use in marking pens which comprises:

(a) water as a solvent;
(b) a colorant dispersed or dissolved in the water in an amount of 0.5–20% by weight:
(c) a water soluble polyvinyl acetal resin as a film-forming agent in an amount of 0.1–15% by weight;

and (d) an aqueous emulsion of an aliphatic carboxylic acid ester which is liquid and nonvolatile or only slightly volatile at room temperatures as a separating agent in a dry amount of 1–20% by weight.

The ink composition preferably further comprises a polyoxyethylene polyoxypropylene block copolymer, or a lanoline derivative, in particular, ethoxylated cholesterol or ethoxylated isocholesterol, or both of these, as a writing separation assistant.

11 Claims, No Drawings

WATER-BASE ERASABLE INK COMPOSITION FOR USE IN MARKING PENS

FIELD OF THE INVENTION

This invention relates to a water base erasable ink composition for use in writing with a marking pen which forms readily erasable writings on an impervious writing surface generally called a white board.

BACKGROUND OF THE INVENTION

There are already known a variety of ink compositions for use in writing with a marking pen which form on an impervious writing surface, such as of enamel, resin or metal, generally called a white board, writings erasable by wiping lightly with felt, dry cloth or paper. These erasable ink compositions usually contain an additive called a separating agent together with an organic solvent, a pigment and a resin.

For example, there is described in Japanese Patent Publication No. 62-9149 an erasable ink composition which contains an aliphatic dibasic carboxylic acid diester and an aliphatic monobasic carboxylic acid ester together with a surfactant, a polyester resin and a saturated fatty acid triglyceride dissolved in an organic solvent.

Like the above exemplified erasable ink compositions, most of the conventional erasable ink compositions contain ketones or alcohols as an organic solvent, amoung which ketones are very toxic. Methanol is also toxic and smells bad. Ethanol is less toxic, but is expensive.

On the other hand, as described in Japanese Patent Application Laid-open No. 60-179478 and No. 60-219273, a water base erasble ink composition is also known which contains an emulsion of such a resin as polyvinyl acetate as a separating agent together with a dyestuff or a pigment as a colorant, and a surfactant. However, when writings are formed with such an ink composition on an impervious surface and dried, the resin emulsion forms a continuous adhesive film on the impervious surface, as is the case with an already known so-called strippable paint. Consequently the writing is not so easily separated or erased from the surface by light wiping. Moreover, when the writing is rather strongly wiped, it is separated as a continuous film from the surface. Namely, even when the writing is wiped only at a part thereof, it often happens that the entire writing is separated from the writing surface.

Thus a number of improvement of water base erasable ink composition for use in marking pens have been recently proposed. For example, as disclosed in Japanese Patent Application Laid-open No. 64-11174 and No. 1-188576, a water base erasable ink composition is known wherein a water soluble polyvinyl alcohol is used as a film-forming agent and an organosilicone surfactant as a separating agent. A further water base erasable ink composition is known in which a film-forming agent is composed either of a by nature water soluble resin or a resin which is by nature water-insoluble, but is made water-soluble by salt-formation with a base, such as water-solubilized styrene-maleic anhydride resin, together with a separating agent composed of an aqueous emulsion of an aliphatic carboxylic acd ester, a higher hydrocarbon or a higher alcohol, as described in Japanese Patent Application Laid-open No. 1-252681.

A still further water base erasable ink composition is known in which polyvinyl acetal resin is used as a film-forming resin and a polyalkylene glycol ester as a separating agent, as described in Japanese Patent Application Laid-open No. 2-117975.

However, the above mentioned prior art water base erasable ink compositions are not found to be sufficient yet in erasability. More specifically, the prior art water base erasable ink compositions deteriorate in erasability as time passes, or becomes less readily erasable depending upon ambient conditions, particularly upon humidity conditions, or upon a material of white board, particularly on a white board of resin such as of unsaturated polyester resin.

BRIEF SUMMARY OF THE INVENTION

The present inventors have made intensive investigations to solve the above-mentioned problem involved in the prior art water base erasable ink compositions, and found that a water base ink composition which contains a water soluble polyvinyl acetal resin as a film-forming agent in combination with an aqueous emulsion of an aliphatic carboxylic acid ester which is liquid and nonvolatile or only slightly volatile at room temperatures as a separating agent forms writings on a white board which can be readily erased only at wiped portions. It has been further found that the use of a specific separation assistant in combination with the separating agent and the film-forming agent grratly improves the erasability of the ink composition after long standing.

Therefore, it is an object of the invention to provide a water base erasable ink composition for use in writing with a marking pen which forms writings readily erasable only at wiped portions irrespectively of ambient conditions after long standing.

According to the invention, there is provided a water base erasable ink composition for use in writing with a marking pen which comprises:

(a) water as a solvent;
(b) a colorant dispersed or dissolved in the water in an amount of 0.5–20% by weight;
(c) a water soluble polyvinyl acetal resin as a film-forming agent in an amount of 0.1–15% by weight; and
(d) an aqueous emulsion of an aliphatic carboxylic acid ester which is liquid and nonvolatile or only slightly volatile at room temperatures as a separating agent in a dry amount of 1–20% by weight.

It is preferred that the ink composition further contains a polyoxyethylene polyoxypropylene block copolymer, or a specific lanoline derivative, or most preferably both of them, as a separation assistant, together with the aliphatic carboxylic acid ester as a separating agent and the water soluble polyvinyl acetal resin as a film-forming agent so that it may form writings having a further improved erasability on a writing surface of any material, such as melamine or unsaturated polyester resin.

DETAILED DESCRIPTION OF THE INVENTION

The ink composition of the invention uses water as a solvent (the balance) in the ink composition. It contains water usually in an amount of 50–90% by weight, preferably in an amount of 60–80% by weight.

The ink composition of the invention contains a colorant, preferably a pigment. The pigment used may include, for example, inorganic pigments such as carbon black, titanium dioxide or ferric oxide, or organic pigments such as phthalocyanines, e.g., copper phthalocyanine blue, azo pigments, quinacridones, anthraquinones, dioxazines, indigos, thioindigos, perynones, perylenes, indolenones and azo-azomethines.

A variety of aqueous pigment dispersions are commercially available, and they may be preferably used in the invention. The dispersion usually contains a dispersant or a surfactant, so that the ink composition of the invention may contain such a dispersant or a surfactant when the dispersion is used in the ink composition. The dispersant is usually a polymeric one and is contained in the dispersion usually in an amount of 1-300 parts by weight, preferably in an amount of 5-100 parts by weight, per one part by weight of pigments.

In the preparation of the water base erasable ink composition of the invention, a pigment may be formed into an aqueous dispersion by use of a resin dispersant, and then the dispersion may be admixed with the other ingredients. According to the invention, a water soluble polyvinyl acetal resin which will be hereinafter mentioned may be preferably used as a resin dispersant.

A dyestuff may also be used as a colorant, preferably a water soluble dyestuff.

The colorant is contained in the ink composition usually in an amount of 0.5-20% by weight, preferably in an amount of 1-15% by weight, based on the ink composition. When the content of colorant is too large, the resultant ink composition has an excessively high viscosity so that it flows insufficiently and writes bad. It is also poor in erasability. On the other hand, when the content of colorant is too small, the ink composition fails to form writings of an appropriate darkness.

The ink composition of the invention contains, as a film-forming agent, a water soluble polyvinyl acetal resin so that when a writing is formed therewith on an impervious writing surface and when the water has evaporated from the writing, there are formed a film or a layer of a separating agent which will be described hereinafter on the impervious writing surface, and thereon a film or a layer of film-forming agent which contains a colorant therein. Thus, the film or layer of the resin is separated from the writing surface by the layer of separating agent, or the layer of separating agent is interposed between the writing surface and the resin layer containing a colorant, so as to make the writing erasable on a white board.

In general, polyvinyl acetal resin is produced by the reaction of polyvinyl alcohol with an aliphatic aldehyde, or by acetalization. However, on one hand, the polyvinyl alcohol cannot be acetalized completely, and on the other hand, in the stage of production of polyvinyl alcohol by saponification of polyvinyl acetate, some of the acetyl groups remain in the resultant polyvinyl alcohol. Accordingly, polyvinyl acetal resin is represented by the formula (I)

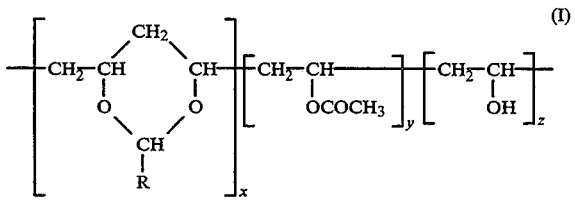

wherein R represents a hydrogen or an alkyl of 1-3 carbons, and thus the resin contains a substantial amount of hydroxyl groups and acetyl groups in the molecule together with the acetal structure.

Preferred polyvinyl acetal resins used in the invention have such a structure in which R is a hydrogen or an alkyl group of 1-3 carbons, namely polyvinyl formal resin, polyvinyl acetal resin (an acetalized product of polyvinyl alcohol with acetaldehyde, polyvinyl acetal resin in the narrow sense), polyvinyl butyral resin (an acetalized product of polyvinyl alcohol with butyraldehyde), or an acetalized product of polyvinyl alcohol with a mixture of acetaldehyde and butyraldehyde, and which has an acetalization degree of 5-40 mol %, a pH of $7\pm2$, and a viscosoty of $4000\pm3000$ centipoises as an aqueous solution of solid content of $18\pm4\%$ at a temperature of 20° C. Such a water soluble polyvinyl acetal resin may be commercially available and such a commercial product may be suitably used in the invention.

The ink composition of the invention contains such a water soluble polyvinyl acetal resin usually in an amount of 0.1-15% by weight, preferably in an amount of 0.2-10% by weight, based on the ink composition. When the content of the polyvinyl acetal resin is more than 15% by weight, the resultant ink composition has an excessively high viscosity so that it flows insufficiently and writes badly. It is also poor in erasability. When the content of the resin is less than 0.1% by weight, the ink composition is short of erasability.

The ink composition of the invention contains, as a separating agent, an aliphatic carboxylic acid ester which is liquid and nonvolatile or only slightly volatile at room temperatures in the form of an aqueous emulsion.

The aliphatic carboxylic acid ester includes monobasic carboxylic acid esters, dibasic carboxylic acid diesters, mono- or diesters of dihydric alcohols, and mono-, di- or triesters of trihydric alcohols, in particular, of glycerine.

More specifically, there may be used monobasic carboxylic acid esters, preferably higher fatty acid alkyl esters wherein the acid residue has 10-22 carbons and the alkyl has 1-10 carbons, such as propyl myristate, butyl palmitate, butyl stearate, octyl stearate or butyl isostearate; dibasic acid diesters, preferably aliphatic dibasic acid dialkyl esters wherein the dibasic acid residue has 4-14 carbons and the alkyl has 1-10 carbons, such as dodecanedioic acid dioctyl ester, dipropyl adipate, dioctyl sebacate or dioctyl azelate; or trihydric alcohol esters such as natural or synthetic fatty acid triglycerides or fatty acid trimethylolpropane triesters such as triisostearate.

The aliphatic carboxylic acid ester is contained in the ink composition in a dry amount of 1-20% by weight, preferably in an amount of 2-15% by weight, based on the ink composition. When the amount of the aliphatic carboxylic acid ester is less than 1% by weight based on the ink composition, the resultant ink composition is not readily erasable on a white board, whereas when the amount of the aliphatic carboxylic acid ester is more than 20% by weight, the resultant ink composition stains a white board therewith when writings formed are wiped away. Moreover, the writing is not readily erased.

The ink composition of the invention may contain, as an additional separating agent, a higher hydrocarbon or a higher alcohol ether of which is nonvolatile or only slightly volatile and liquid at room temperatures, as an aqueous emulsion.

The higher hydrocarbon used as a separating agent is not specifically limited, but may be exemplified by liquid paraffin and squalane. An oxidized polyethylene wax may also be used. The higher alcohol used is also not specifically limited, but may be exemplified by hexyl alcohol, octyl alcohol or lauryl alcohol.

An aqueous emulsion of such aliphatic acrboxylic acid esters, higher hydrocarbons or higher alcohols as above mentioned may be prepared by any conventional emulsifying method, and such an emulsion is commercially available.

The additional separating agent may be solid, and may be dissolved in an aliphatic carboxylic acid ester used as the principal separating agent. For example, cetyl alcohol or stearyl alcohol may be used as such an additional separating agent.

The additional separating agent may be used in an amount of not more than 10% by weight, preferably not more than 5% by weight, based on the ink composition.

It is preferred that the ink composition of the invention contains, as a writing separation assistant, at least one of a polyoxyethylene polyoxypropylene block copolymer and a lanoline derivative, and most preferably, both of them.

The polyoxyethylene polyoxypropylene block copolymer used in the invention is a water-soluble polymer and is known as a kind of a surfactant. It is preferred that the block copolymer has an oxyethylene content of not more than 40% by weight and a molecular weight of about 700–3000.

The polyoxyethylene polyoxypropylene block copolymer used in the invention may be represented preferably by the formula (II)

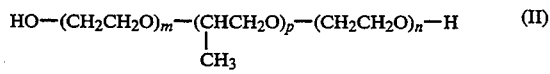

$$\text{HO}-(CH_2CH_2O)_m-(CHCH_2O)_p-(CH_2CH_2O)_n-H \quad\quad (II)$$
$$\quad\quad\quad\quad\quad\quad\quad\quad\quad\quad | $$
$$\quad\quad\quad\quad\quad\quad\quad\quad\quad CH_3$$

wherein m, n and p are such numerals as render the molecular weight of the block copolymer to be in the range of 700–3000. The polyoxyethylene polyoxypropylene block copolymer is especially useful to further improve the erasability of the ink composition as a whole, and in particular, the erasability of writings after long standing.

Such a polyoxyethylene polyoxypropylene block copolymer is commercially available such as Newpol PE-61, PE-62 or PE-71 (Sanyo Kasei Kogyo K.K., Japan), Pluronic L-31, L-44, L-61, L-64, F-68, P-84, F-83 or L-101 (Asahi Denka Kogyo K.K., Japan), Epan 420 or 720 (Daiichi Kogyo Seiyaku K.K., Japan), Emulgen PP-150 or PP-230 (Kao K.K., Japan), Pronon 102 or 201 (Nippon Yushi K.K., Japan), Actinol P-3035 (Matsumoto Yushi Seiyaku K.K., Japan), Lionol PL-32, PL-42 or PL-712 (Lion K.K., Japan).

It is preferred that the ink composition contains such a block copolymer in an amount of 0.1–5% by weight based on the ink composition. When the amount is too small, the resultant ink composition may not be sufficiently improved in erasability, whereas when the amount is too large, the resultant ink composition may stain a white board therewith when it is wiped. It is most preferred that the ink composition contains the copolymer in an amount of 0.2–3% by weight.

In turn, the lanoline derivative used in the invention may be exemplified by, for instance, lanoline alcohol derived from purified lanoline, alkoxylated lanoline alcohol obtained by alkoxylation of lanoline alcohol, fatty acid ester of lanoline alcohol obtained by esterification of lanoline alcohol with a fatty acid, acetylized lanoline alcohol obtained by acetylation of lanoline alcohol, hydrogenated lanoline alcohol, and alkoxylated cholesterol or isocholesterol obtained by alkoxylation of cholesterol or isocholesterol which is obtained by solvent fractionation of lanoline alcohol. In the above description, the alkoxylated product means addition products preferably of ethylene oxide to lanoline alcohol, cholesterol or isocholesterol, or ethoxylated products.

Among the lanoline derivatives above mentioned, ethoxylated cholesterol is most preferred. The ethoxylated cholesterol is also known as a kind of surfactant since it has a long chain structure composed of oxyethylene units together with a hydrocarbon group. In use of the ethoxylated cholesterol in the ink composition, it is usually used as a solution in a mixture of ethanol and water.

Many of the above mentioned lanoline derivatives are commercially available. For example, ethoxylated lanoline alcohol is available as Bellpol A-20, ethoxylated cholesterol as Bellpol C-24, ethoxylated lanoline as Bellpol L-19, L-30 or L-75 (Yoshikawa Seiyu K.K., Japan).

The lanoline derivative is especially useful to improve the erasability of the ink composition on a white board of resin such as melamine resin or unsaturated polyester resin.

It is preferred that the ink composition contains such a lanoline derivative as above mentioned in an amount of 0.01–5% by weight based on the ink composition. When the amount is too small, the resultant ink composition may not be sufficiently improved in erasability on a white board of resin, whereas when the amount is too large, the resultant ink composition may have an excessively large viscosity so that it writes badly. Most preferably, the lanoline derivative may be contained in an amount of 0.1–2% by weight based on the ink composition.

The ink composition of the invention preferably contains both the polyoxyethylene polyoxypropylene block copolymer and the lanoline derivative as a separation assistant together with the aliphatic carboxylic acid ester as a separating agent, so that it may form highly erasable writings on a white board of any material, more specifically highly erasable irrespectively of material of white board and ambient conditions, even after long standing.

The ink composition of the invention may contain a water soluble polyhydric alcohol to assist the separation of writings on a white board therefrom.

The polyhydric alcohol usable includes, for example, (poly)alkylene glycols such as ethylene glycol, diethylene glycol, triethylene glycol, propylene glycol, dipropylene glycol, tripropylene glycol, polyethylene glycol having an average molecular weight of about 200–600, polypropylene glycol having an average molecular weight of about 1000–3000, glycerine and trimethylolpropane. The polyhydric alcohol may be contained in an amount of not more than 20% by weight, preferably in an amount of not more than 10% by weight, based on the ink composition. When the amount of the polyhydric alcohol is more than 20% by weight, the resultant ink composition has an excessively large viscosity and writes badly.

The ink composition of the invention may contain, as a film forming assistant, a resin other than the water soluble polyvinyl acetal resin which is film-forming at room temperatures to improve leveling properties of writing on a white board and dipersibility of colorant in the ink composition.

The film-forming assistant resin usable may include, for example:

(1) an aqueous emulsion or a hydrosol of a water-insoluble resin such as polyvinyl acetates, vinyl acetate copolymers, alkyd resins, acrylic resins or polyurethane resins;

(2) a water-solublized resin which is by nature water insoluble, but are made water-soluble by salt formation, with inorganic or organic bases, such as alkali metal salts, e.g., sodium or potassium salts, ammonium salts or amine salts, exemplified by, for example, water-solublized vinyl acetate copolymers, alkyd resins, styrene-maleic anhydride resins, maleic oils, maleic polybutadiene, maleic alkyd resins, maleic petroleum resins, maleic rosin ester resins, alkyd resins or polyurethane resins; and (3) a by nature water soluble resin.

The vinyl acetate copolymer mentioned above as a water-insoluble resin in an aqueous emulsion or a hydrosol, or as a water-solublized resin may include copolymers of vinyl acetate with vinyl esters other than vinyl acetate such as vinyl propionate; unsaturated carboxylic acids such as acrylic acid, methacrylic acid, maleic acid, maleic anhydride, fumaric acid, itaconic acid, crotonic acid or citraconic acid; vinyl hydrocarbons such as ethylene, propylene, styrene, α-methylstyrene; unsaturated carboxylic acid esters such as methyl acrylate, ethyl acrylate or dimethyl maleate. The vinyl acetate copolymer may be a graft polymer with the monomers as above described onto polyvinyl acetates.

Preferred vinyl acetate copolymers may be exemplified by vinyl acetate-acrylic acid copolymer, vinyl acetate-methacrylic acid copolymer, vinyl acetate-styrene-acrylic acid copolymer, vinyl acetate-styrene-maleic anhydride copolymer, vinyl acetate-acrylic acid-methyl acrylate copolymer, vinyl acetate-methacrylic acid-methyl acrylate copolymer, vinyl acetate-acrylic acid-ethyl acrylate copolymer, vinyl acetate-methacrylic acid-methyl methacrylate copolymer and vinyl acetate-maleic anhydride copolymer.

The water-solubilized polyvinyl acetate and vinyl acetate copolymers, and also the emulsion or hydrosol of such polyvinyl acetate and vinyl acetate copolymers as above mentioned are commercially available. The emulsion or hydrosol of alkyd resins or polyrurethane resins are also commercially available.

The water-solublized alkyd resins may be prepared by condensation of excessive unsaturated carboxylic acids with polyhydric alcohols, and then by salt formation with alkali metal bases, ammonium bases or organic amines. The water-solubilized polyurethane resin may be prepared by salt-formation of pendant carboxylic groups in the polymer chain with alkali metal bases, ammonium bases or organic amines. These water-solubilized alkyd resins and polyurethane resins are also commercially available.

There may be mentioned as resins which are water soluble by nature, for example, synthetic resins such as polyvinyl pyrrolidone or polyvinyl alcohol having a polymerization degree of 100-3000 and a saponification degree of not less than 50 mol %. Natural water soluble resins such as shellac or gum arabic may also be used.

The film-forming assistant resin as above described may be contained in the ink composition in a dry amount of 0.1-15% by weight, preferably in an amount of 0.3-10% by weight, based on the ink composition. When the amount of the resin is too large, the resultant ink composition has an excessively high viscosity so that it writes badly but also writings formed therewith are not readily erased.

Among the above described film-forming assistant resins, there may be preferably used emulsions or hydrosols of water-insoluble resins, or such resins which are by nature water-insoluble, but are made water-soluble by salt-formation as hereinbefore described. When the ink composition contains such a film-forming assistant resin and forms writings, the resin forms a film or a layer of the resin as a carrier of a colorant together with the polyvinyl acetal resin on the film or layer of the separating agent on a white board, so that the writings are not only water resistant but also erasable irrespectively of ambient conditions of temperature and humidity.

The ink composition of the invention may further contain a surfactant, either anionic, nonionic, cationic or ampholytic, as a further writing separation assintant. Among the surfactants are preferred polyoxyethylene carboxylic acid, sulfonic acid, sulfate or phosphate nonionic or anionic surfactants, ampholytic betaine surfactants or fluorinated surfactants. The amount of surfactants may be not more than 10% by weight, preferably in the range of 0.2-5% by weight, based on the ink composition. The use of exessive amount deteriorates erasability of the ink composition.

Although the invention is not limited by any theory, however, when writings are formed on an impervious writing surface with a marking pen, and when the water has evaporated or the writing has been dried, the polyvinyl acetal resin forms a film together with the film forming assistant resin as it contains the colorant, while the emulsion of the separating agent is broken to form a continuous oily layer between the writing surface and the resin film, and accordingly the writing is readily separable or erasable from the surface by being wiped.

The hereinabove mentioned surfactant assists the separation of the oily layer from the resin layer when writings are formed. Moreover, the surfactant provides a levelling effect with writings formed but also prevents the emulsion from being unevenly distributed on a writing surface when writings are formed, so that the dried writings are evenly erasable.

Lower aliphatic alcohols may be contained in the ink composition so that writings are readily dried when formed. However, the alcohol must not break the emulsion in the ink composition, and therefore the amount may be not more than 15% by weight, preferably in the range of 1-10% by weight, based on the ink composition. The preferred alcohol may be ethanol, propanol or butanol.

The ink composition may further contain any conventional additives used in water base ink compositions, such as pH controllers, antiseptics, antifungal agents, anticorrosion agents or dispersion assistant in effective amounts.

As so far set forth, the ink composition of the invention is a water base composition using water as a solvent and a water soluble polyvinyl acetal resin as a film-forming agent in combination with an aliphatic carboxylic acid ester which is liquid and nonvolatile or only slightly volatile at room temperatures as a separating agent and contained in the form of emulsion. Accordingly, the ink composition of the invention is, very little toxic, and is attended by very little bad and irritating smell.

Furthermore, the separating agent is liquid and nonvolatile or only slightly volatile at room temperatures so that the ink composition of the invention forms on a white board writings composed of a continuous oily layer of the separating agent and a layer of the polyvinyl acetal resin which contains a colorant therein on the oily layer of the separating agent. Accordingly, the writings are readily separated or erased from the white board as the conventional solvent base erasable ink compositions.

In particular, the separating layer is not a solid film, but an oily one, so that when the writings are wiped only partly, the wiped portions only are erased. Further, since the separating layer is composed of nonvolatile or only slightly volatile liquid compound, writings are readily erasable after long standing.

As a further feature, the ink composition of the invention contains a water soluble polyvinyl acetal resin as a film-forming agent, it forms writings readily erasable even on a white board having a writing surface of resin such as melamine or unsaturated polyester resin.

As a still further feature, when the ink composition contains a by nature water insoluble resin in a water-solubilized form, or more preferably in the form of hydrosol or emulsion, the resin forms a film or a layer in cooperation with the polyvinyl acetal resin, and thus such writings are highly water resistant as well as readily erasable irrespectively of ambient humidity conditions.

The use of polyoxyethylene polyoxypropylene block copolymer and lanoline derivative as a separation assistant together with the aliphatic carboxylic acid ester as a separating agent and the water soluble polyvinyl acetal resin as a film-forming agent makes the ink composition unexpectedly highly erasable on a white board of any resin irrespectively of ambient conditions even after long standing.

The ink composition of the invention may be produced by a conventional method, and is not limited to any specific method. By way of example, when a normal pigment is used as a colorant, the pigment is mixed with a dispertant in water, the resultant mixture is milled in a bead mill to disperse the pigment finely in the water to form a mill base, there are added a separating agent, a film-forming resin and other components if necessary to the mill base, and then the resultant mixture is stirred. When a resin-coated pigment is used as a colorant, all the components may be mixed together at the same time, and the pigment may be dispersed in the solvent used with a paint shaker. In either methods, the resultant ink composition may be filtered or centrifuged to remove therefrom coarse materials.

Examples of the ink composition of the invention will now be described, however, the invention is not limited thereto. In the examples, the amounts are represented in terms of % by weight, and the balance water. The ink compositions contain an antiseptic and antifungal in an effective amount.

Example 1

| | |
|---|---|
| Colorant: Phthalocyanine green | 2 |
| Dispersant: Ammonium salt of styrene-butyl acrylate-methacrylic acid copolymer | 2 |
| Film-forming agent: Polyvinyl acetal resin[1] | 2 |
| Film-forming assistant: Vinyl acetate-ethyl acrylate-acrylic acid copolymer (hydrosol) | 1 |
| Separating agent: Isopropyl myristate (emulsion) | 8 |
| Surfactant: Anionic | 0.5 |

Example 2

| | |
|---|---|
| Colorant: Carbon black | 5 |
| Dispersant: Acrylic resin[2] | 3 |
| Film-forming agent: Polyvinyl acetal resin | 1 |
| Film-forming assistant: Polyurethane resin (emulsion) (emulsion)[3] | 5 |
| Separating agent: Butyl stearate (emulsion) | 5 |
| Dioctyl dodecanedioate (emulsion) | 5 |
| Surfactant: Anionic | 1 |

Example 3

| | |
|---|---|
| Colorant: Threne Blue | 3 |
| Dispersant: Vinyl acetate-acrylic acid copolymer (hydrosol)[4] | 5 |
| Film-forming agent: Polyvinyl acetal resin | 5 |
| Separating agent: Butyl laurate (emulsion) | 4 |
| Squalane (emulsion) | 1 |
| Surfactant: Ampholytic | 1.5 |

Example 4

| | |
|---|---|
| Colorant: Carbon black | 3 |
| Dispersant: Vinyl acetate-acrylic acid copolymer (hydrosol) | 3 |
| Film-forming agent: Polyvinyl acetal resin | 1.5 |
| Film-forming assistant: Polyurethane resin (emulsion) | 4 |
| Separating agent: Cetyl isooctanoate (emulsion) | 8 |
| Surfactant: Nonionic | 2 |

Example 5

| | |
|---|---|
| Colorant: Monoazo Red | 4 |
| Dispersant: Polyvinyl acetal resin | 2 |
| Film-forming agent: Polyvinyl acetal resin | 0.5 |
| Film-forming assistant: Acrylic resin[5] | 2 |
| Separating agent: Butyl palmitate (emulsion) | 12 |
| Lauryl alcohol (emulsion) | 3 |
| Surfactant: Nonionic | 0.5 |

Example 6

| | |
|---|---|
| Colorant: Threne Blue | 3 |
| Dispersant: Polyvinyl acetal resin | 1 |
| Film-forming agent: Polyvinyl acetal resin | 0.5 |
| Film-forming assistant: Polyurethane resin (emulsion) | 1 |
| Separating agent: Butyl isostearate (emulsion) | 5 |
| Surfactant: Nonionic | 1 |

Example 7

| | |
|---|---|
| Colorant: Monoazo Red | 4 |
| Dispersant: Polyvinyl acetal resin | 2 |
| Film-forming agent: Polyvinyl acetal resin | 0.5 |
| Film-forming assistant: Polyvinyl acetate (emulsion)[6] | 1 |
| Separating agent: Butyl isostearate (emulsion) | 10 |
| Surfactant: Nonionic | 1 |

Example 8

| | |
|---|---|
| Colorant: Special Black TU-Paste[7] | 20 |
| Dispersant: Polyvinyl acetal resin | 4 |
| Film-forming agent: Water-solubilized alkyd resin | 2 |
| Separating agent: Octyl stearate (emulsion) | 5 |
| Liquid paraffin (emulsion) | 2 |
| Separation assistant: Polypropylene glycol (having an average molecular weight of 1000) | 0.5 |
| Surfactant: Nonionic | 1 |

Example 9

| | |
|---|---|
| Colorant: Phthalocyanine green | 2 |
| Dispersant: Polyvinyl acetal resin | 1 |
| Film-forming agent: Polyvinyl acetal resin | 1 |
| Separating agent: Cetyl stearate (emulsion) | 4 |
| Surfactant: Anionic | 1 |

Example 10

| | |
|---|---|
| Colorant: Carbon black | 5 |
| Dispersant: Acrylic resin[2] | 4 |
| Film-forming agent: Polyvinyl acetal resin | 1.5 |
| Film-forming assistant: Acrylic resin[2] | 1 |
| Separating agent: Dioctyl dodecanedioate (emulsion) | 8 |
| Surfactant: Nonionic | 0.5 |

Comparative Example 1

| | |
|---|---|
| Colorant: Phthalocyanine green | 2 |
| Dispersant: Ammonium salt of styrene-butyl acrylate-methacrylic acid copolymer | 2 |
| Film-forming agent: Vinyl acetate-ethyl acrylate-acrylic acid copolymer (hydrosol) | 3 |
| Separating agent: Isopropyl myristate (emulsion) | 8 |
| Surfactant: Anionic | 0.5 |

-continued

| Comparative Example 2 | |
|---|---|
| Colorant: Carbon black | 5 |
| Dispersant: Acrylic resin[2] | 3 |
| Film-forming agent: Polyurethane resin (emulsion) | 6 |
| Separating agent: Butyl stearate (emulsion) | 5 |
| Dioctyl dodecanedioate (emulsion) | 5 |
| Surfactant: Anionic | 1 |
| Comparative Example 3 | |
| Colorant: Threne Blue | 3 |
| Dispersant: Vinyl acetate-acrylic acid copolymer (hydrosol) | 5 |
| Film-forming agent: Vinyl acetate-acrylic acid copolymer (hydrosol) | 5 |
| Separating agent: Butyl laurate (emulsion) | 4 |
| Squalane (emulsion) | 1 |
| Surfactant: Ampholytic | 1.5 |
| Comparative Example 4 | |
| Colorant: Carbon black | 3 |
| Dispersant: Vinyl acetate-acrylic acid copolymer (hydrosol) | 3 |
| Film-forming agent: Polyurethane resin (emulsion) | 5.5 |
| Separating agent: Cetyl isooatanoate (emulsion) | 8 |
| Surfactant: Nonionic | 2 |
| Comparative Example 5 | |
| Colorant: Monoazo Red | 4 |
| Dispersant: Acrylic resin[2] | 2 |
| Film-forming agent: Acrylic resin[5] | 2.5 |
| Separating agent: Butyl palmitate (emulsion) | 12 |
| Lauryl alcohol (emulsion) | 3 |
| Surfactant: Nonionic | 0.5 |
| Comparative Example 6 | |
| Colorant: Threne Blue | 3 |
| Dispersant: Polyurethane resin (emulsion) | 1 |
| Film-forming agent: Polyurethane resin (emulsion) | 1.5 |
| Separating agent: Butyl isostearate (emulsion) | 5 |
| Surfactant: Nonionic | 1 |
| Comparative Example 7 | |
| Colorant: Monoazo Red | 5 |
| Dispersant: Polyvinyl alcohol | 10 |
| Film-forming agent: Polyvinyl acetate (emulsion) | 3 |
| Separating agent: Butyl isostearate (emulsion) | 10 |
| Surfactant: Nonionic | 1 |
| Comparative Example 8 | |
| Colorant: Special Black TU-Paste | 20 |
| Dispersant: Water-solubilized alkyd resin | 6 |
| Separating agent: Octyl stearate (emulsion) | 5 |
| Liquid paraffin (emulsion) | 2 |
| Separation assistant: polypropylene glycol (having an average molecular weight of 1000) | 0.5 |
| Surfactant: Nonionic | 1 |
| Comparative Example 9 | |
| Colorant: Carbon black | 5 |
| Dispersant: Acrylic resin[2] | 4 |
| Film-forming agent: Acrylic resin[5] | 2.5 |
| Separating agent: Dioctyl dodecanedioate (emulsion) | 8 |
| Surfactant: Nonionic | 0.5 |

Notes:
[1] Esreck K, aqueous solution (solid content of 20% by weight), Sekisui Kagaku Kogyo K.K.
[2] Hiros AW-36, Seiko Kagaku K.K.
[3] Rikabond GL-39, aqueous solution (solid content of 30% by weight), Chuo Rika Kogyo K.K.
[4] Rikabond SA-L, aqueous solution (solid content of 30% by weight), Chuo Rika Kogyo K.K.
[5] Boncoat ST-372, Dainippon Ink Kagaku Kogyo K.K.
[6] Polysol HF-C, Showa Kobunshi K.K.
[7] Aqueous dispersion of pigment, Hoechst Gosei K.K.

Writings were formed on a white board of enamel or melamine resin with each of the ink compositions, and their "initial" erasability was examined. The initial erasability is defined as the erasability of writing when being wiped with an eraser made of dry cloth under a load of 100-200 g after standing for five minutes.

The erasability was evaluated as follows. When the writing was erased by wiping one to three times with an eraser, the erasability was marked "A"; when the writing was erased by wiping four to eight times, the erasability was marked "B"; when the writing was erased by wiping seven to nine times, the erasability was marked "C"; and when the writing was not erased by wiping ten times or more, the erasability was marked "D".

The results are indicated in Table 1. The ink composition of the invention provides writings on a white board which are readily erased in contrast to the ink composition containing no polyvinyl acetal resin therein.

TABLE 1

| | Initial Erasability of Ink Compositions on White Board of | |
|---|---|---|
| | Enamel | Melamine Resin |
| Example | | |
| 1 | A | A |
| 2 | A | A |
| 3 | A | B |
| 4 | A | A |
| 5 | A | A |
| 6 | A | A |
| 7 | A | B |
| 8 | B | B |
| 9 | A | A |
| 10 | A | A |
| Comparative Example | | |
| 1 | B | C |
| 2 | B | B |
| 3 | B | D |
| 4 | B | B |
| 5 | B | D |
| 6 | B | B |
| 7 | C | D |
| 8 | C | D |
| 9 | C | C |

| Example 11 | |
|---|---|
| Colorant: Carbon black | 5 |
| Dispersant: Polyvinyl acetal resin | 1 |
| Film-forming agent: Polyvinyl acetal resin | 1 |
| Separating agent: Butyl isostearate (emulsion) | 4 |
| Separation assistant: Block copolymer[8] | 0.5 |
| Surfactant: Nonionic | 1 |
| Example 12 | |
| Colorant: Threne Blue | 3 |
| Dispersant: Polyvinyl acetal resin | 1 |
| Film-forming assistant: Polyurethane resin (emulsion) | 1.5 |
| Separating agent: Cetyl stearate (emulsion) | 6 |
| Separation assistant: Block copolymer | 2 |
| Surfactant: Nonionic | 0.5 |
| Example 13 | |
| Colorant: Carbon black | 5 |
| Dispersant: Polyvinyl acetal resin | 1 |
| Film-forming agent: Polyvinyl acetal resin | 1 |
| Separating agent: Butyl isostearate (emulsion) | 4 |
| Separation assistant: Ethoxylated cholesterol[9] | 0.8 |
| Surfactant: Nonionic | 1 |
| Example 14 | |
| Colorant: Threne Blue | 3 |
| Dispersant: Polyvinyl acetal resin | 2 |
| Film-forming assistant: Polyurethane resin (emulsion) | 1.5 |
| Separating agent: Cetyl stearate (emulsion) | 6 |
| Separation assistant: Ethoxylated cholesterol | 0.2 |
| Surfactant: Nonionic | 0.5 |
| Example 15 | |
| Colorant: Carbon black | 5 |
| Dispersant: Polyvinyl acetal resin | 1 |
| Film-forming agent: Polyvinyl acetal resin | 1 |
| Separating agent: Butyl isostearate (emulsion) | 4 |
| Separation assistant: Block copolymer | 0.5 |
| Ethoxylated cholesterol | 0.8 |
| Surfactant: Nonionic | 1 |
| Example 16 | |
| Colorant: Threne Blue | 3 |
| Dispersant: Polyvinyl acetal resin | 2 |
| Film-forming assistant: Polyurethane resin (emulsion) | 1.5 |

-continued

| | |
|---|---|
| Separating agent: Cetyl stearate (emulsion) | 6 |
| Separation assistant: Block copolymer | 2 |
| Ethoxylated cholesterol | 0.2 |
| Surfactant: Nonionic | 0.5 |
| Comparative Example 10 | |
| Colorant: Carbon black | 5 |
| Dispersant: Polyvinyl acetal resin | 1 |
| Film-forming agent: Polyvinyl acetal resin | 1 |
| Separating agent: Butyl isostearate (emulsion) | 4 |
| Surfactant: Nonionic | 1 |
| Comparative Example 11 | |
| Colorant: Threne Blue | 3 |
| Film-forming agent: Polyvinyl acetal resin | 1 |
| Film-forming assistant: Polyurethane resin (emulsion) | 1.5 |
| Separating agent: Cetyl stearate (emulsion) | 6 |
| Surfactant: Nonionic | 0.5 |

Notes:
[8] Pluronic L-64, having an oxyethyl content of 40% by weight and a molecular weight of polyoxypropylene block of 1750, Asahi Denka Kogyo K.K. (Japan)
[9] Belepal C-24, Yoshikawa Seiyu K.K. (Japan)

Writings were formed on a white board of enamel, melamine resin or unsaturated polyester resin with each of the ink compositions, and their "standing" erasability was examined. The standing erasability is defined as the erasability of writing when being wiped with an eraser made of dry cloth under a load of 100–200 g after standing for 12 hours at room temperatures.

TABLE 2

| | Standing Erasability of Ink Compositions on White Board of | | |
|---|---|---|---|
| | Enamel | Melamine Resin | Unsaturated Polyester Resin |
| Example | | | |
| 11 | A | C | C |
| 12 | A | B | C |
| 13 | B | A | B |
| 14 | B | A | B |
| 15 | A | A | A |
| 16 | A | A | B |
| Comparative Example | | | |
| 10 | B | C | D |
| 11 | B | C | D |

The results are indicated in Table 2. The ink composition containing a separation assistant of the invention is improved in erasability as a whole. The writing is readily or fairly erasable on a white board either of melamine resin or of unsaturated polyester resin, whereas the ink composition containing no separation assistant of the invention is poor in the standing erasability particularly on a white board of unsaturated polyester resin.

What is claimed is:

1. A water-base erasable ink composition for use in marking pens which comprises:

(a) a solvent consisting essentially of water and not more than 15% by weight of a lower aliphatic alcohol;

(b) a colorant dispersed or dissolved in the water in an amount of 0.5–20% by weight;

(c) a water soluble polyvinyl acetal resin as a film-forming agent in an amount of 0.1–15% by weight;

(d) an aqueous emulsion of an aliphatic carboxylic acid ester which is liquid and nonvolatile or only slightly volatile at room temperature as a separating agent in a dry amount of 1–20% by weight, the amount of said alcohol, if present, being insufficient to break said emulsion;

and (e) at least one of a polyoxyethylene polyoxypropylene block copolymer in an amount of 0.1–5% by weight and a lanoline derivative in an amount of 0.01–5% by weight, as a writing separation assistant.

2. The ink composition as claimed in claim 1 which further comprises a resin which is by nature water-insoluble, but is made water-soluble by salt formation with a base, or an aqueous emulsion or a hydrosol of a water insoluble resin, as a film-forming assistant, in a dry amount of 0.1–15% by weight.

3. The ink composition as claimed in claim 1 which further comprises an additional separating agent selected from a higher aliphatic hydrocarbon and a higher fatty alcohol is an amount of not more than 10% by weight.

4. The ink composition as claimed in claim 1 which contains a polyoxyethylene polyoxypropylene block copolymer in an amount of 0.1–5% by weight and a lanoline derivative in an amount of 0.01–5% by weight, both as a writing separation assistant.

5. The ink composition as claimed in claim 1 wherein the lanoline derivative is ethoxylated cholesterol.

6. The ink composition as claimed in claim 1 which further comprises a water soluble polyhydric alcohol as a further writing separation assistant in an amount of not more than 20% by weight.

7. The ink composition as claimed in claim 1 wherein the colorant is an inorganic or organic pigment.

8. The ink composition as claimed in claim 1 wherein the polyvinyl acetal resin is an acetalized product of polyvinyl alcohol with acetaldehyde, butyraldehyde or a mixture of these.

9. The ink composition as claimed in claim 4 wherein the lanoline derivative is ethoxylated cholesterol.

10. The ink composition as claimed in claim 1 wherein said alcohol is present at 1–10% by weight.

11. The ink composition as claimed in claim 1 wherein the solvent consists of water.

* * * * *